Oct. 16, 1945.  K. B. RIS  2,386,747
BIMETAL TUBE
Filed Jan. 27, 1944
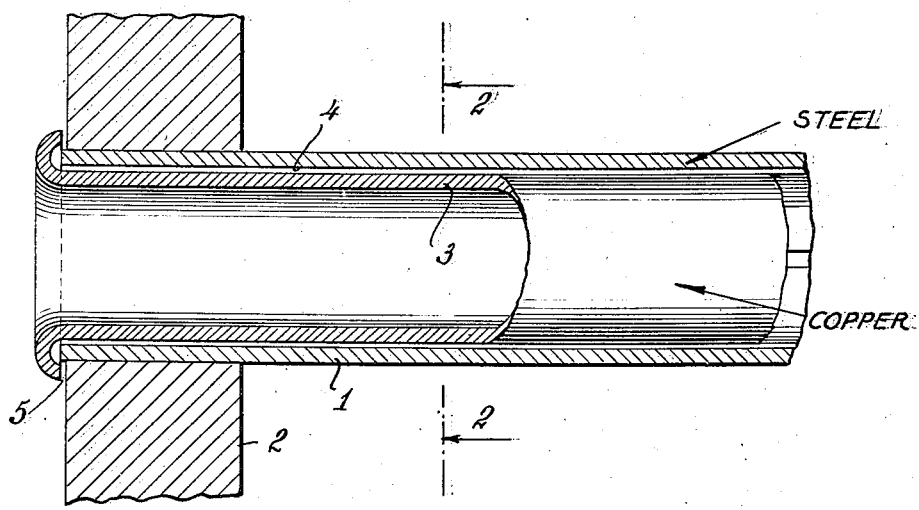
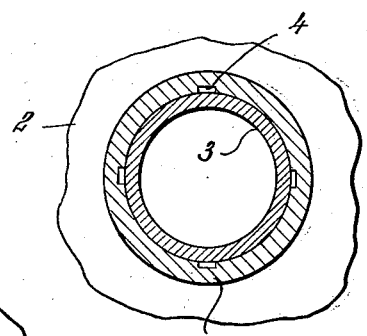
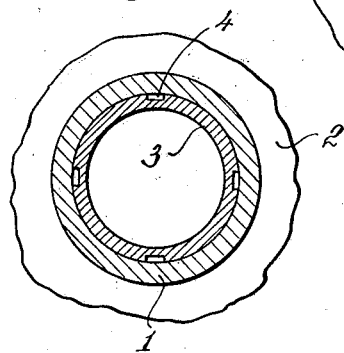
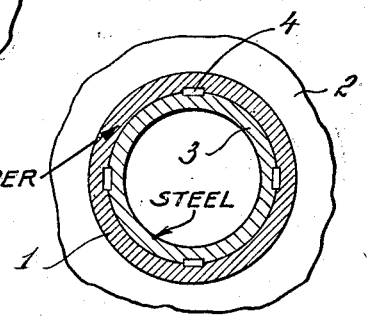
INVENTOR
KENNETH B. RIS
BY
Pennie, Davis, Marvin & Edmonds
HIS ATTORNEYS Patented Oct. 16, 1945

2,386,747

UNITED STATES PATENT OFFICE 2,386,747

BIMETAL TUBE

Kenneth B. Ris, Garden City, N. Y., assignor to The Griscom Russell Company, New York, N. Y., a corporation of Delaware Application January 27, 1944, Serial No. 519,901

4 Claims. (Cl. 138—62)

This invention relates to bi-metal tubes and has for its object to provide a bi-metal tube for use in heat exchangers and the like where it is desirable or necessary to combine in one tube the properties of two different metals. Such tubes are particularly useful in heat exchangers for handling liquids or gases of a corrosive nature under high pressures. For such purposes it is desirable to employ steel tubes in order to have the necessary strength to withstand the pressure. At the same time it is necessary to provide a surface for contact with the corrosive fluid of a metal which is not attacked by the fluid. For such purposes it has been customary in the past to employ steel tubes lined with a brass or copper tube.

Such tubes have also been employed in refrigerating apparatus where ammonia vapors are in contact with the outside of the tube and water for cooling is circulated within the tube. There are other uses wherein the arrangement is reversed. For example, for cooling corrosive vapors by means of a circulating liquid under high pressure, bi-metal tubes are used consisting of a copper, brass or other non-ferrous metal outer tube to withstand the action of corrosive vapors and a steel inner tube to provide the necessary strength.

Tubes of this type have not proven entirely satisfactory in the past. Experience has shown that without apparent defect in the materials used or in the fabrication of the tube, such tubes may fail after a brief period of use. Examination of the tubes indicates that gas had formed between the two tubes and collapsed or ruptured the weaker tube. The gas formation is probably due to electrolysis or some other chemical action resulting from minute impurities in the metal, but whatever the cause and however carefully the tubes are made they have been subject to unpredictable failure.

I have found that the difficulties resulting from this gas formation at the interface of the two metals may be obviated by the very simple expedient of providing shallow grooves extending continuously for the length of the tube in either the outer surface of the inner tube or the inner surface of the outer tube, or in both. The grooves are left open at the ends and thereby provide vents for the escape of any gas that may be formed at the interface of the two tubes.

In the accompanying drawing wherein I have illustrated my invention

Fig. 1 is a longitudinal section through a bi-metal tube of my preferred construction together with the surrounding portion of the tube sheet in which the tube is mounted;

Fig. 2 is a sectional view on line 2—2 of Fig. 1; and

Figs. 3 and 4 are similar views showing slight modifications of the construction shown in Fig. 2.

Referring to the drawing, particularly Figs. 1 and 2, I indicates the outer tube, in this instance, formed of steel. Fitting tightly in the outer tube is the inner tube 3 which may be of brass or other metal suitable for the particular fluid for which the apparatus is designed to form a tight heat-conducting contact between the tubes. The inner tube may be mechanically expanded in the outer tube, or the outer tube may be thermally shrunk on the inner, or the tubes may be otherwise united in any suitable manner.

The outer tube, as shown in Figs. 1 and 2, is provided with a number of longitudinally extending grooves 4 which extend throughout the length of the tube and are open at the ends to permit the escape of any gas that may be formed by electrolysis or otherwise between the tubes.

In the construction shown the inner tube 3 is extended beyond the outer tube and bent back over the end of the outer tube but with the bent-over edge of the tube not quite in contact with the adjacent face of the tube sheet 2, as indicated at 5 in Fig. 1. The purpose of this construction is to provide a vent from the grooves 4 and at the same time prevent any significant circulation of the fluid which is flowing through the inner tubes into the grooves 4. The fluid which is circulated through the tubes is usually of a character to be corrosive to the steel outer tube and although the surface of the steel within the grooves 4 is exposed to the corrosive fluid, the amount of corrosion will be negligible, due to the small amount of liquid which can be retained in the groove, unless there is a continuous flow of the fluid through the groove. In the construction shown, that is, with the ends of the grooves covered by the expanded end portion of the copper tube, there will be no significant circulation of the corrosive fluid through the grooves. The space 5 may be very narrow, in the order of one or two thousandths of an inch, but as the space is co-extensive with the circumference of the tube, the opening may be very narrow and yet provide ample relief for any gas that may be trapped between the tubes.

The number of grooves is of course not critical. The four longitudinal grooves are ample for tubes of the diameter shown in Fig. 2 to relieve the pressure which would otherwise be generated by gas formation between the surfaces of the tubes. Of course, instead of being longitudinal the grooves may extend spirally of the tube or in any other manner so long as the vents formed by the grooves open to the outside, and the distance between the grooves is not too great.

In Fig. 3 I have shown the groove as formed in the outer wall of the copper tubing instead of the inner wall of the steel tube. The advantage of this construction is that the steel tube may be of thin material which should not be weakened by cutting a groove in the metal.

In Fig. 4 I have shown a modification wherein the steel tube is on the inside and the copper tube on the outside. In the construction shown in this figure I have shown both the inner and outer tubes grooved to provide an escape for trapped gases. The grooves preferably register with each other, and by this arrangement sufficient escape is provided for the gases that may be formed between the tubes without appreciably reducing the thickness of the wall of either tube.

I have found in actual practice that while the heat transfer surface between the tubes is theoretically reduced to an extent equal to the total width of all the grooves, the actual heat transfer per unit of surface of the tube may be quite as great as that of a bi-metal tube of the same structure but ungrooved after a short period of use. For even though the gas formation be insufficient to rupture the tube, the conduction of heat from one surface to the other is seriously impaired by even a thin film of trapped gas. This loss in heat transfer surface soon compensates for the reduction in heat transfer surface occasioned by the grooves.

With my improved tube any gas that forms at any point along the length of the tube finds ready escape to the adjacent groove without causing a distortion of the metal of the tube beyond the elastic limit. The gas formation therefore does not permanently impair the tube or reduce its heat transfer efficiency whereas with the ordinary bi-metal tube even a slight formation of gas will produce large areas where the walls of the two tubes are separated and with these spaces filled with dead gas the heat transfer efficiency will be greatly reduced.

I claim:

1. A double-walled tube consisting of an inner tube of one kind of metal and an outer tube of another kind of metal, and in which gas forms between said tubes, the inner tube fitting tightly within the outer tube with substantially all of the adjacent surfaces of the tubes in direct and continuous contact and a narrow groove in one of the contacting metal tube surfaces extending to one end of said tube for venting gas which forms between said tubes.

2. A double-walled tube consisting of an inner tube of one kind of metal and an outer tube of another kind of metal, and in which gas forms between said tubes, the inner tube fitting tightly within the outer tube with substantially all of the adjacent surfaces of the tubes in direct and continuous contact and a narrow groove in one of the contacting metal tube surfaces extending throughout the length of said tube for venting gas which forms between said tubes.

3. A double-walled tube consisting of an inner tube of one kind of metal and an outer tube of another kind of metal, and in which gas forms between said tubes, the inner tube fitting tightly within the outer tube with substantially all of the adjacent surfaces of the tubes in direct and continuous contact and a plurality of narrow grooves in one of the contacting metal tube surfaces, each of said grooves extending to one end of said tube for venting gas which forms between said tubes.

4. A double-walled tube consisting of an inner tube of one kind of metal and an outer tube of another kind of metal, and in which gas forms between said tubes, the inner tube fitting tightly within the outer tube with substantially all of the adjacent surfaces of the tubes in direct and continuous contact, a narrow groove in one of the contacting metal surfaces extending to one end of said tube for venting gas which forms between said tubes and a tube sheet for one end of said tube, the inner tube extending beyond the outer tube at the outside of said tube sheet, said extending end being turned outwardly over the end of the outer tube and spaced therefrom.

KENNETH B. RIS.